United States Patent [19]

Nearpass et al.

[11] Patent Number: 4,474,661
[45] Date of Patent: Oct. 2, 1984

[54] FILTER DRYER

[75] Inventors: Gary A. Nearpass, Clyde; Walter O. Krause, Newark, both of N.Y.

[73] Assignee: Parker-Hannifin Corporation, Cleveland, Ohio

[21] Appl. No.: 508,306

[22] Filed: Jun. 27, 1983

[51] Int. Cl.³ .............................................. B01D 29/00
[52] U.S. Cl. ...................................... 210/437; 55/316; 210/446; 210/DIG. 7
[58] Field of Search ................ 55/316, 387, DIG. 17; 210/437, 446, 450, 456, DIG. 6, DIG. 7, 457

[56] References Cited

U.S. PATENT DOCUMENTS

| 2,873,856 | 2/1959 | Jones | 210/DIG. 7 |
| 3,025,233 | 3/1962 | Figert | 210/DIG. 7 |
| 3,434,599 | 3/1969 | Wischmeyer et al. | 55/316 |
| 4,177,145 | 12/1979 | Schumacher | 210/DIG. 6 |
| 4,320,000 | 3/1982 | Lange et al. | 210/117 |

Primary Examiner—Ivars Cintins
Attorney, Agent, or Firm—Joseph B. Balazs

[57] ABSTRACT

A filter dryer for refrigeration systems includes a generally tubular molded desiccant core therein. The central opening of the core is sealed and one end thereof supported by a forced-in plastic ball which itself is retained in a seat dimpled in the inlet baffle.

7 Claims, 2 Drawing Figures

FILTER DRYER

BACKGROUND OF THE INVENTION

Filter dryers are conventionally used in refrigeration systems for removing moisture and particulate matter from the system. A molded desiccant core has become commonplace for use in such systems since the core provides a combined function of filtration and adsorption and may be packaged in many different configurations. An advantage of the molded core is that it can be formed in a generally tubular configuration to achieve a high cross-sectional area for exposure to the fluid flow and thus efficient utilization of the desiccant material.

One example of such prior art device is shown in U.S. Pat. No. 4,320,000 in which a tubular desiccant core is supported on tubular structure between transverse partitions. In this patent seal pads are provided at either end to assure that the desiccant core is not bypassed. The present invention is directed to an improved arrangement for sealing and supporting the ends of a tubular desiccant core.

SUMMARY OF THE INVENTION

The filter dryer of this invention consists of a tubular copper housing having flow ports at either end and a molded tubular desiccant core centrally disposed within the housing. An annular gasket seals one end of the core as well as the flow path through the housing to assure that refrigerant flow is through the core structure. The gasket, a filter screen and one end of the core are supported within a perforated metal cap pressed into the housing. A plastic ball pressed into the central opening of the other end of the core seals that opening to protect against fluid bypass of the core. The ball and thus the core are supported within a central indentation of a perforated metal baffle at the inlet. In the described method of manufacture, the indentation of the inlet baffle is formed as the baffle is pressed into the housing and against the ball and core, thereby insuring appropriate registration among the components of the filter dryer.

DESCRIPTION OF THE PREFERRED EMBODIMENT

Figure 1:
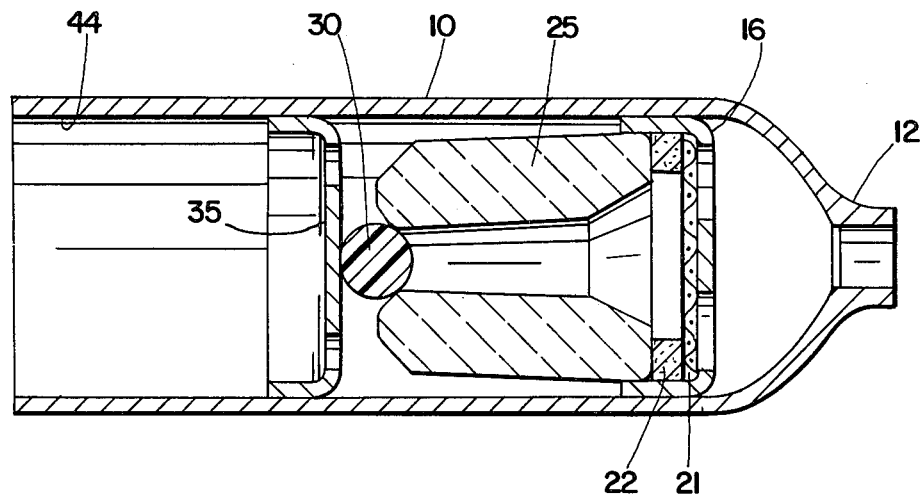
FIG. 1 is a cross-sectional view of the filter dryer at one stage of its manufacture.

Referring now to the drawings, the filter dryer of the invention consists of generally tubular housing 10 necked at either end to form inlet port 11 and outlet port 12. Housing 10 is typically a length of copper tubing as seen more clearly in the partly completed showing of the unit of FIG. 1. The inlet and outlet ports 11, 12 are formed by a spinning operation in which a tool is brought into frictional engagement with each end of the rotating housing to deform and neck the material to a smaller diameter. Further machining may be performed as appropriate to shape the ports. The completed housing 10, as seen in FIG. 2, then includes inlet and outlet sections 14, 15, respectively, of smaller diameter than the central portion of housing 10 and leading to the inlet and outlet ports 11, 12.

A perforated cup-shaped support 16 is press fit within housing 10 adjacent outlet section 15. Support 16 comprises a stamped metal disc having four relatively large perforations 18 equally spaced in the transverse wall 19 and an axially extending peripheral edge flange 20 providing a snug fit within housing 10. Transverse wall 19 thus fully spans the interior of housing 10. Disc shaped filter screen 21 and annular gasket 22 are sandwiched and disposed within support 16, fully spanning the space within the peripheral edge 20.

Filter screen 21 is a disc of conventional woven material, preferably brass, on the order of 120 mesh and serves to prevent desiccant fines and other particulate matter from reaching outlet port 12. Gasket 22 is a compressed fibrous material such as fiberglass, that prevents bypass flow of particulate matter around the outlet end of core 25.

A generally conically tapered and tubular desiccant filter core 25 is disposed centrally within housing 10, having the larger diameter outlet end received within the edge flange 20 of support 16 and pressed into sealing engagement with gasket 22. A central opening 26 is provided in core 25, gradually widening toward the outlet 12 end and culminating in a yet wider flared opening 28. The openings 26, 28 are shaped in this manner to assure release of core 25 from mold forms as core 25 is preferably a molded mixture of activated alumina and molecular sieve. The tubular configuration of the core 25 provides a desired cross-sectional area for exposure to refrigerant and thus efficient utilization of desiccant material. In this arrangement, refrigerant flow is generally through the tapered outer periphery of the core 25 to the central openings 26, 28, in a general radial flow pattern, thus utilizing the entire length of core 25.

To assure this flow pattern, the inlet end of opening 26 must be sealed to prevent bypass flow. One known arrangement for this is to cement a steel disc at the inlet end of opening 26, however, such expedient requires close control of the cementing parameters to assure that opening 26 is sealed. This is made more difficult due to the fact that relatively high temperatures are encountered within the structure when housing 10 is deformed as by spinning to form the inlet and outlet ports 11, 12.

In this embodiment of the invention a ball 30 is pressed into central opening 26 to fully seal the opening and prevent bypass refrigerant flow therethrough. Ball 30 is sized slightly greater than the diameter of opening 26 and once pressed in place is retained therein by frictional engagement with the periphery of opening 26. In this embodiment of the invention where the size of desiccant core 25 is on the order of 2-3 cubic inches, the diameter of opening 26 is on the order of 0.360-0.365 inch and ball 30 is on the order of 0.375 inch in diameter. Ball 30 is preferably composed of Teflon or nylon or other plastic material compatible with refrigerants, but may as well be metal. As indicated, the heat of spinning of housing 10, is a factor which must be considered.

Inlet baffle 35 is provided to support the inlet end of core 30 and to distribute and direct fluid flow toward the tapered periphery of the core 30. Baffle 35 is a steel stamping including transverse wall 36 spanning the inside diameter of housing 10 and peripheral flange 38 which is a press fit within the housing. Transverse wall 36 includes multiple perforations 39 spaced about the outer edge thereof for distributing and directing the flow of refrigerant fluid over the outer periphery of core 25. Core 25 may include outer bevel 40 to assist in distribution of the flow in this manner as well as an inner bevel 41 for receipt of ball 30.

Inlet baffle 35 also includes recess 42 at the central portion thereof formed by an indentation of transverse wall 36 toward inlet port 11. Ball 30 is received in recess 42 and in this manner serves to support the inlet end of core 25. Inlet baffle 35, as noted, is supported by frictional engagement between flange 38 and housing 10, but is also retained axially in position by the reduced diameter of inlet section 14 of housing 10, adjacent the edge of flange 38. In this manner, transverse wall 36 is in engagement with the inlet end of core 30 and serves to deter flow of refrigerant at that location.

Referring again to FIG. 1, it will be seen that a significant advantage of this invention is that recess 42 of inlet baffle 35 may be formed in place to assure accurate registration with ball 30 and support of the inlet end of core 25. Thus during assembly of the filter dryer a subassembly consisting of outlet support 16, filter screen 21, gasket 22 and desiccant core 25 with ball 30 in central opening 26 thereof may be placed within housing 10. Outlet port 12 may have been formed previously by spinning, but the assembly could be retained in position and the port 12 formed later.

Figure 2:
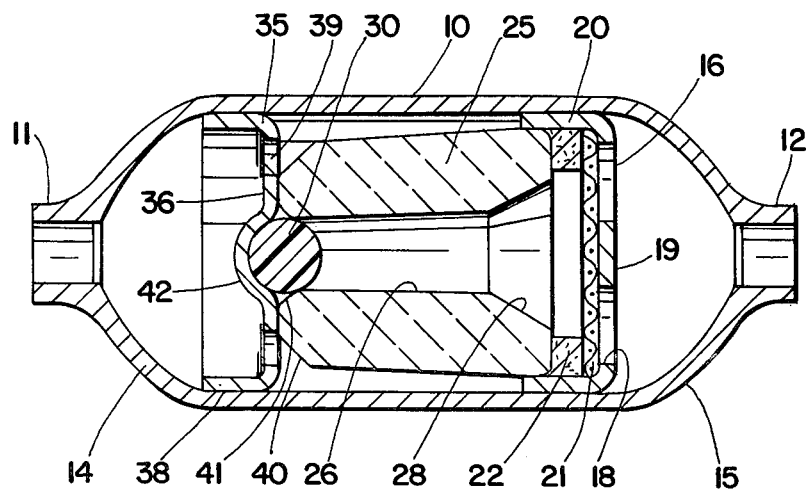
FIG. 2 is a cross-sectional view of the completed filter dryer of the invention.

Inlet baffle 35 in the undeformed condition shown in FIG. 1 may be inserted in the tubular open end of housing 10 and the baffle 35 pressed into engagement with ball 30 at the inlet end of the assembly. A force on the order of 2000 lbs. may be applied against baffle 35 and the described subassembly, causing deformation of transverse wall 36 and formation of recess 42 therein. Such force assures that core 25 is well seated in outlet support 16 and compressed against gasket 22, forming an effective fluid seal thereby. Since inlet baffle 36 is guided within housing 10 by peripheral flange 38, recess 42 is guaranteed of registration with ball 30 and uniform support of the desiccant core 25. Thereafter inlet port 11 may be formed by spinning down the open end 44 of housing 10 to secure the components in the filter dryer.

What is claimed is:

1. A filter core dryer for refrigeration systems, comprising
    an elongated tubular casing having an inlet and outlet at opposite ends thereof,
    a molded desiccant core in said casing, said desiccant core being of generally tubular configuration generally spanning said casing and having a central through passage therein extending the full length of said core,
    an outlet filter screen disposed between said desiccant core and said outlet for preventing particulate matter from reaching said outlet,
    a perforated baffle disposed between said inlet and said desiccant core for distributing fluid flow from said inlet into plural paths, said baffle spanning said casing and having a recess at the central portion thereof, and a separate non-porous member closely fitted and fixed in said central passage of said desiccant core at the inlet end thereof, said member spanning said passage to prevent flow of fluid therethrough and projecting from said passage toward said inlet and into engagement with said perforated baffle at said recess for support of said desiccant core.

2. The filter dryer set forth in claim 1 wherein said non-porous member is a ball in said central passage of said desiccant core and said recess in said perforated baffle is an indentation conforming to the portion of said ball projecting from said passage.

3. The filter dryer set forth in claim 2 wherein said indentation is formed by pressing said perforated baffle into engagement with said ball during assembly of said filter dryer structure.

4. The filter dryer set forth in claim 3 wherein said ball is plastic and said perforated baffle is a metallic cap snugly received in said casing.

5. The filter dryer set forth in claim 4 wherein said plastic ball is formed of Teflon material.

6. The filter dryer set forth in claim 3 wherein said casing is copper and comprises necked portions at the inlet and outlet thereof, said necked portions being formed by inwardly deforming said casing in a spinning operation.

7. The method of manufacture of a filter dryer assembly, comprising the steps of
    necking one end of a copper tube to form a port for flow of fluid through the tube,
    placing an assembly of components into said copper tube, said components consisting of a tubular desiccant core having a central aperture therein, a ball in said central aperture protruding therefrom and a perforated metallic cap having a generally planar face in engagement with said ball,
    forcing said assembly of components together while in said copper tube into an axially compressed position whereby an indentation is formed in said planar face of said metallic cap by said ball, and thereafter,
    necking the other end of said copper tube to form a second port for flow of fluid through the tube and for securing the assembly of components therein in the axially compressed position.

* * * * *